Nov. 13, 1928.
F. SCHELBEN
1,691,859
TRUCK BODY
Filed Sept. 28, 1927  2 Sheets-Sheet 2
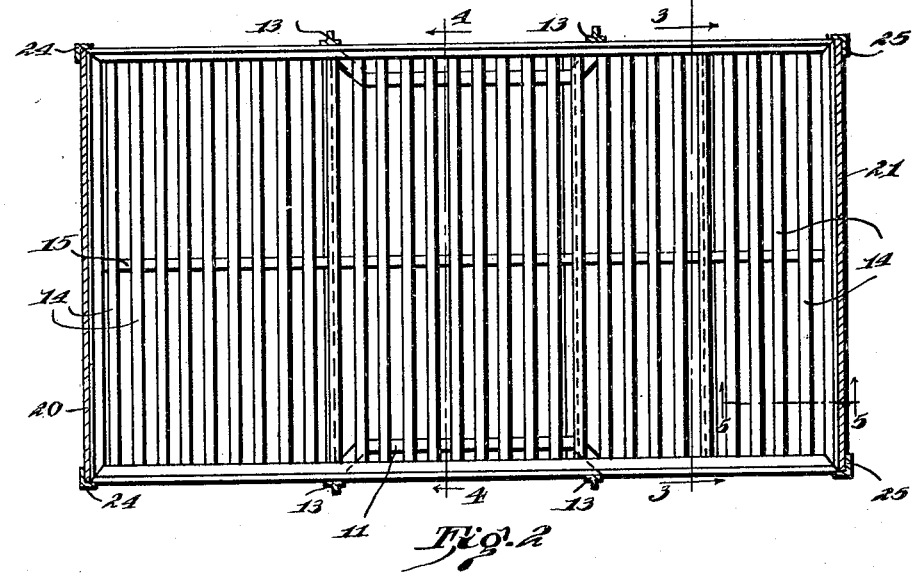
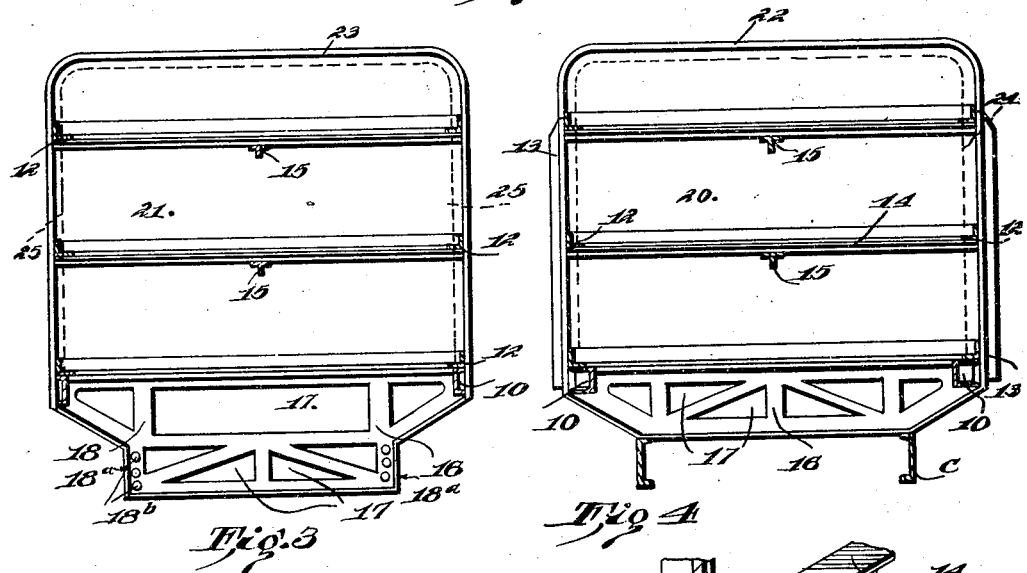
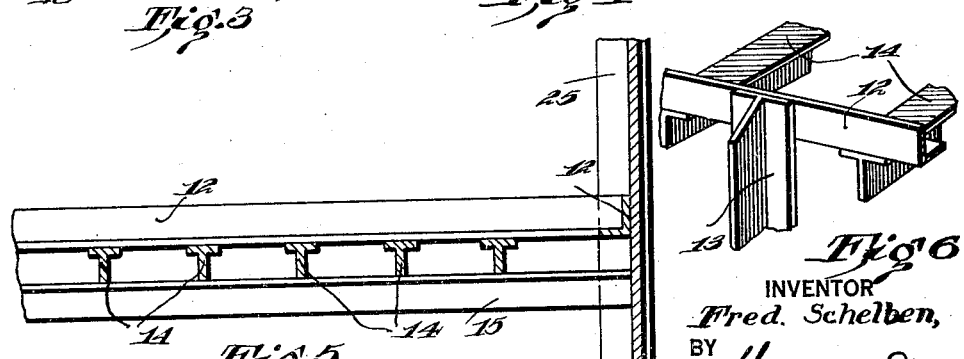
INVENTOR
Fred. Schelben,
BY
ATTORNEY Patented Nov. 13, 1928.

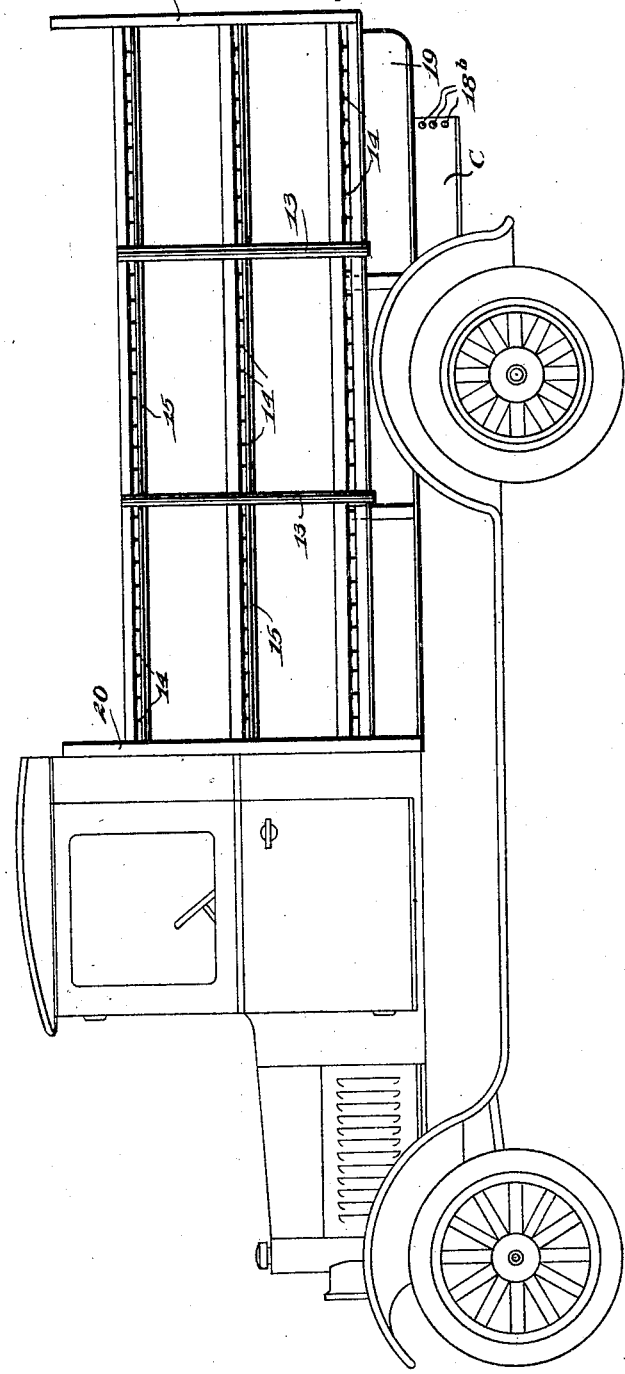

1,691,859

UNITED STATES PATENT OFFICE.

FRED SCHELBEN, OF GREENVILLE, MISSISSIPPI.

TRUCK BODY.

Application filed September 28, 1927. Serial No. 222,596.

The present invention relates to truck bodies, and more particularly to all-steel multiple deck truck bodies, designed for the transportation of cases of carbonated beverages or the like.

An object of the invention is to provide a multiple deck steel body the frame of which is of open work steel made up of T beams and supports that can be easily cleaned; and that furnishes comparatively little or no lodgment for dirt or dust.

Another object is to provide the lower supports or cross members or beams that carry the main frame made of pressed steel and the surplus metal cut out to reduce the weight and to form skeleton transverse sills.

Another object is to provide a frame running lengthwise of the body with side channel irons offset inwardly over the rear walls to form a space and clearance of the wheels and fenders.

Another object of the invention is to provide a spare tire rack at the rear end under the frame, which permits a spare tire to be stored and removed from the sides or laterally.

Another object is to produce a body frame that can be easily installed on any chassis with the aid of few fastening parts.

With these and other objects which will appear as the description proceeds, the invention consists in the novel construction, arrangement and combinations of parts as will be hereinafter more fully described and pointed out in the claims, reference being had to the accompanying drawings forming a part hereof, in which Figure 1 is a side elevation showing the truck body installed as in use showing a threedeck frame for carrying carbonated beverages or like bottled goods, Figure 2 is a sectional plan view of the body showing a deck, and the side guards.

Figure 3 is a transverse section on the line 3—3, of Figure 2,

Figure 4 is a similar view taken on line 4—4 of Figure 2 and showing the offset bottom beams, Figure 5 is an enlarged fragmentary sectional view showing the arrangement of the T-beams, Figure 6 is a fragmentary perspective view.

In carrying out the invention the main frame running lengthwise of the body is made up of light steel channel side beams 10; these channel beams are offset inwardly as at 11 over the rear wheels forming a space and clearance for wheels and fenders as plainly illustrated in Figure 2.

On top of these channel beams and at each side a light angle 12 is provided forming a guard to retain the cases of bottled goods which fit securely between the said guards and are prevented from sliding out when the truck turns a corner.

These angle irons are the same on all three decks with two vertical supports 13 intermediate the ends to support the weight of the cases; these supports 13 are T bars, with the heads welded to the guards 12.

The supports 14 are slats upon which the angle iron guards are supported and extend across the truck, and are small T-irons, spaced apart so that each case will cover about three of these members. These cross members are in turn supported in the center by a slightly heavier T-iron 15 running lengthwise or longitudinally of the body. All of these members are under tension and cannot bend without stretching all of the material at one time.

The lower supporting cross members or trusses 16 are four in number which carry the main frame and are made of pressed steel, the surplus metal being cut out, as seen at 17, to reduce the weight, thus forming very light trusses.

The rear truss 18 is provided with a downward extension 18ᵃ which is of less width than the truck body portion and is secured to the chassis as indicated at 18ᵇ in Figures 1 and 3.

Extending from the truss 18 is a flat floor which provides a spare tire rack 19; this rack being open at the side so that the tire can be readily inserted and removed laterally of the truck body. The truck body extends over the tire rack and forms a housing for the tire.

All of the various parts of the truck body are secured together by electric welding, except the front and back members 20 and 21, which are of sheet iron, and these are secured by bolts to the angle iron members 22 and 23, thus providing a frame that is rigid, the parts of which will not shake loose.

At the front and rear corners the angle irons or braces 24 and 25 are placed embracing the end frames 22 and 23, of the truck body and materially strengthening the entire structure.

A very advantageous and satisfactory feature of this construction and arrangement is that a truck body is provided that is more sanitary for transporting liquid containers, and there is little or no chance of mud accumulating thereon as is often the case where a solid body is used.

However, even if some should accumulate, a person can by the use of an ordinary water hose, wash any part of it, and, as there are no cracks or spaces for the lodgment of mud and dust it will readily be seen that the truck body can be easily kept clean.

The guard members 12 while adding greatly to the strength and rigidity of the device also prevents the case of bottles from being thrown off by centrifugal force action in making turns.

It is of course obvious that this frame can be easily installed, as only a few bolts or rivets are needed to fasten it to the chassis.

It will be observed that the spare tire-rack extends rearwardly beyond the end of the chassis and opens laterally back of the rear wheels, so that the spare can be readily got at when occasion requires.

From the above it will be readily seen that I provide a metallic truck body that is relatively light, very strong and rigid and one that the cases of bottled goods will be safely carried in the same, without danger of being thrown out by collisions or otherwise, and one that is sanitary and can be made at low cost and can be readily and quickly cleaned.

I claim:

1. A truck body comprising longitudinally extending side channel beams, transverse skeleton trusses, supporting said side beams, transverse T-beam slats supported on said side beams, longitudinally extending T-beams supporting said slats intermediate their ends, and angled guard beams supported at each end of said transverse slats.

2. A skeleton truck body comprising longitudinal side channel beams, transverse skeleton trusses supporting said side beams, front and rear angled frames secured to said side beams, central longitudinally extending T beams, transverse T beam slats supported and secured on said central beams, angled guard beams secured to the ends of said slats, and vertical T brace beams secured to said guard beams, intermediate the front and rear ends thereof.

3. A skeleton truck body comprising side channel members, front and rear angled end frames secured to said channel members, vertically spaced angled side guard beams secured to said end frames, longitudinally disposed central T beams, transverse T-beam slats supported on and secured to said central beams, said guard beams also secured on the opposite ends of said slats, and skeleton transverse trusses supporting the aforesaid structure.

4. A truck body comprising longitudinal side channel bars adapted to be removably secured to a chassis, polygonal shaped angled end frames rigidly secured to said channel bars, a slotted floor secured to said side bars, angled guard bars rigidly secured on said slotted floor and surrounding the same, and transverse trusses, supporting the aforesaid structure and unit.

5. A truck body comprising longitudinally extending side channel beams, transverse trusses supporting said side beams, said trusses being disposed at the front and rear of the body and intermediate the ends thereof, the rear truss having a rear extension providing a spare tire rack, said rack opening laterally at one side.

FRED SCHELBEN.